April 13, 1937. C. MAHR 2,077,123
GAUGE
Filed Jan. 26, 1934
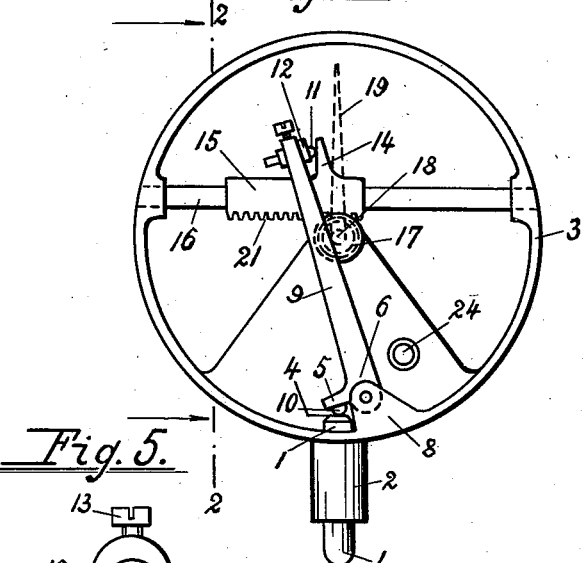
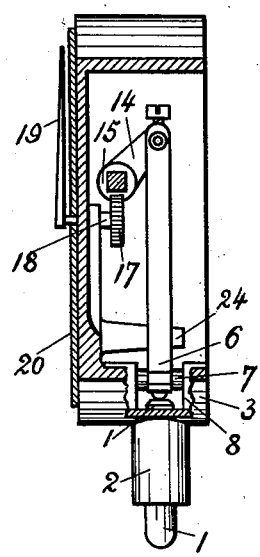
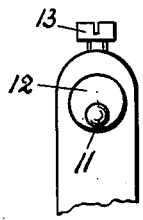
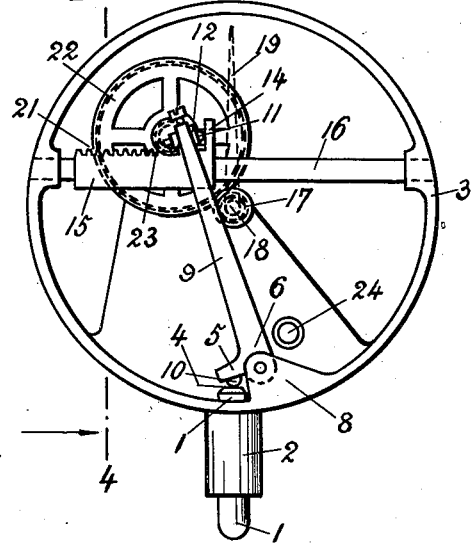
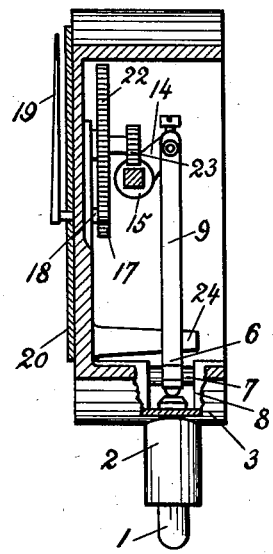
Inventor
Carl Mahr.
per
Attorney.

Patented Apr. 13, 1937

2,077,123

UNITED STATES PATENT OFFICE 2,077,123

GAUGE

Carl Mahr, Esslingen, Germany, assignor to Carl Mahr G. m. b. H., Esslingen, Germany Application January 26, 1934, Serial No. 708,392 In Germany March 3, 1933

2 Claims. (Cl. 33—172)

This invention relates to a gauge, more particularly to a gauge indicating very small distances on a large scale.

An object of this invention resides in the provision of a design for a gauge for indicating minute distances on a large scale whereby faulty indications due to clearances are almost completely eliminated.

An object of this invention resides in the provision of a design for a gauge adapted to transmit extremely small movements and to indicate same on a large scale.

An object of this invention resides in the provision of a design for a gauge adapted to transmit extremely small movements and to indicate same on a large scale and having a minimum number of bearings or fulcrums and, for this reason, practically no friction or clearances causing faulty indications.

An object of this invention resides in the provision of a design for a gauge adapted to transmit extremely small movements and to indicate same on a large scale and having only a very small number of parts, said parts being sturdy and the device therefore being inexpensive, reliable and lasting.

An object of this invention is the provision of a gauge for transmitting and indicating minute distances or movements on a large scale whereby all parts effecting the transmission are of such configuration as to facilitate their manufacture and to assure accurate transmission.

Another object of this invention is the provision of a gauge for transmitting and indicating minute distances or movements on a large scale whereby the indication can be changed without difficulty from fractions of inches into fractions of millimeters by the adjustment of only one member.

A further object of my invention resides in the provision of a gauge for transmitting and indicating on a large scale straight minute distances or movements whereby the length of the straight movement of a feeler is multiplied and transferred to the likewise straight movement of a slide.

Further and other objects of the present invention will be hereinafter set forth in the accompanying specification and claims and shown in the drawing which, by way of illustration, shows what I now consider to be a preferred embodiment of my invention.

In the drawing:

Fig. 1 is a view from the rear into a gauge according to my invention.

Fig. 2 is a cross section through the gauge shown in Fig. 1 and along line 2—2 of Fig. 1 looking in the direction of the arrows.

Fig. 3 is a view from the rear into a modified gauge according to my invention.

Fig. 4 is a cross section through a gauge as per Fig. 3 and along line 4—4 on Fig. 2 looking in the direction of the arrows.

Fig. 5 is a large scale showing of a detail of my invention.

Referring more particularly to Figs. 1 and 2 of the drawing: 1 is a feeler slidably arranged within guide 2 which is attached to gauge casing 3. The upper flat surface 4 of the feeler contacts with the short leg 5 of lever 6 which, for this purpose, is provided with a spherical surface 10. Lever 6 is carried by pin 7 which is supported by ears 8 connected to casing 3. The long leg 9 of lever 6 is provided with a spherical surface 11. This, however, is not directly and rigidly connected to the leg but is eccentrically mounted to pin 12 which is rotatably located in the end of leg 9 illustrated on a larger scale in Fig. 5. A set screw 13 is provided to lock pin 12 in the desired position. Instead of providing the long leg 9 with an adjustable sphere, I may make this provision on the short leg 5 or on both legs. Point member 11 contacts with extension 14 of crosshead 15 which slides on rail 16 which is supported by the casing 3. It is obvious that, by revolving pin 12, the effective length of arm 9 can be varied, and the transmission ratio of lever 6 can be changed. The lower part of crosshead 15 is provided with a rack 21 engaging pinion 17 which is supported by one end of pin member 18 which is revolvably supported by casing 3. Pointer 19 is connected to the other end of the pin member and is revolved together with pinion 17. 20 is a dial.

Instead of attaching the spherical surfaces 10 and 11 to the arms of lever 6, these surfaces could be provided on the feeler and/or on extension 14 of crosshead 15, and the ends of the arms could be provided with flat surfaces. Racks and wheels such as those designated by 21 and 17 can be manufactured very accurately and with a perfect engagement, and the readings of the gauge are consequently very exact.

If a larger ratio of transmission, i. e., readings on a larger scale, are desired or required, an intermediary gear 22—23 may be interposed between crosshead 15 and its rack 21 and the pinion 17 operating pointer 19. Such an arrangement, which assures good readings of measurements of 1/10,000 of an inch or less, is shown on Figs. 3 and 4. In this case, rack 21 is provided on the upper part of the slide or crosshead 15. The use of only one gear assures much greater accuracy in measurements and in readings than is obtained with gauges having a plurality of gears. It is always advantageous to arrange the ratio of the arms of lever 6 as large as possible, because the lever assures the most accurate transmission, and the accuracy of the total transmission depends largely on the accuracy of the primary transmission.

In order to limit the movement of feeler 1 and pointer 9, a stop 24 is provided. Thus any shocks applied to feeler 1 are absorbed by lever 6, which inherently is a rugged part, and are not transmitted to the sensitive parts of the gear transmission.

The eccentricity of point 11 on pin 12 may be such as to provide for an adjustment between 25 and 25.4. This allows an easy change of the readings from fractions of inches to fractions of millimeters.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A gauge for transmitting and indicating on a large scale minute movements comprising a feeler, a lever having a short and a long arm, a crosshead having an extension and a rack, said short arm engaging said feeler, said long arm engaging the extension on said crosshead, spherically surfaced members interposed between said short arm and said feeler and between said long arm and said extension, the position of at least one of said members being adjustable with respect to the arm to which it is attached thereby rendering the leverage of said lever adjustable for the purposes set forth, a gear engaging said rack, and a pointer attached to said gear.

2. A gauge for transmitting and indicating on a large scale minute movements comprising a feeler, a lever having a short and a long arm, a crosshead having an extension and a rack, said short arm engaging said feeler, said long arm engaging the extension on said crosshead, spherically surfaced members interposed between said short arm and said feeler and between said long arm and said extension, at least one of said members being eccentrically mounted to a cylindrical rotatable member rotatably attached to said lever and permitting adjustment of the leverage of said lever for the purposes set forth, a gear engaging said rack, and a pointer attached to said gear.

CARL MAHR.